United States Patent
Ko et al.

(10) Patent No.: US 8,023,170 B1
(45) Date of Patent: Sep. 20, 2011

(54) TOTAL INTERNAL REFLECTION MODULATOR

(75) Inventors: James G. Ko, Vancouver (CA); Meritt W. Reynolds, Burnaby (CA)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 12/730,305

(22) Filed: Mar. 24, 2010

(51) Int. Cl.
G02F 1/03 (2006.01)
G02F 1/29 (2006.01)

(52) U.S. Cl. ........ 359/263; 359/245; 359/254; 359/259; 359/317

(58) Field of Classification Search .................. 359/245, 359/254, 259–263, 290–295, 311, 313, 315–318, 359/237, 238, 323, 572, 265–275; 345/108, 345/206; 385/8
See application file for complete search history.

(56) References Cited

U.S. PATENT DOCUMENTS

| | | | |
|---|---|---|---|
| 3,958,862 A * | 5/1976 | Scibor-Rylski | 359/261 |
| 4,125,318 A * | 11/1978 | Scibor-Rylski | 359/317 |
| 4,196,977 A * | 4/1980 | Scibor-Rylski | 359/279 |
| 4,281,904 A * | 8/1981 | Sprague et al. | 359/263 |
| 4,406,521 A | 9/1983 | Mir et al. | |
| 4,514,739 A * | 4/1985 | Johnson et al. | 347/248 |
| 4,780,732 A * | 10/1988 | Abramov | 347/239 |
| 5,064,277 A * | 11/1991 | Blazey et al. | 359/276 |
| 5,153,770 A * | 10/1992 | Harris | 359/245 |
| 5,291,566 A * | 3/1994 | Harris | 385/8 |
| 5,319,491 A * | 6/1994 | Selbrede | 359/291 |
| 5,734,491 A | 3/1998 | Debesis | |
| 5,841,579 A | 11/1998 | Bloom et al. | |
| 5,991,065 A * | 11/1999 | Nutt et al. | 359/245 |
| 6,288,822 B2 | 9/2001 | Romanovsky | |
| 6,381,060 B1 * | 4/2002 | Romanovsky | 359/245 |
| 7,656,571 B1 * | 2/2010 | Reynolds | 359/261 |

* cited by examiner

*Primary Examiner* — Loha Ben
(74) *Attorney, Agent, or Firm* — Nelson Adrian Blish

(57) ABSTRACT

A total internal reflection (TIR) modulator includes a member comprising an electro-optic material; a plurality of first electrode sets; a plurality of second electrode sets; and a first set of electrical conductors, each electrical conductor in the first set of electrical conductors being coupled to one of the second electrode sets wherein the electrodes in each second electrode set are arranged in an interdigitated relationship with the electrodes in one of the first electrode sets; and each of the first electrode sets comprises a first electrode, the first electrodes being arranged in an interdigitated relationship with the electrical conductors in the first set of electrical conductors.

26 Claims, 9 Drawing Sheets

TOTAL INTERNAL REFLECTION MODULATOR

CROSS REFERENCE TO RELATED APPLICATIONS

Reference is made to commonly-assigned copending U.S. patent application Ser. No. 12/730,311, entitled IMPROVED TOTAL INTERAL REFLECTION MODULATOR, by Ko et al., the disclosure of which is incorporated herein.

FIELD OF THE INVENTION

The invention relates to apparatus for forming images on a surface, and more particularly to improvements to light modulators that employ electro-optic materials.

BACKGROUND OF THE INVENTION

Electro-optic materials are those whose optical properties change in accordance with the strength of an electric field established within them. These materials make possible an electrically controlled electro-optic modulator for use in a light valve array.

One well known form of electro-optic modulators are total internal reflection (DR) modulators which can be employed in laser-based imaging systems for example. FIGS. 1A and 1B schematically show plan and side views of a conventional TIR modulator 10 comprising a member 12 which includes an electro-optic material and a plurality of electrodes 15 and 16 arranged in an interdigitated relationship on a surface 18 of member 12. Surfaces 20 and 22 are arranged to cause input radiation 25 to refract and undergo total internal reflection at surface 18.

In this typical conventional configuration, various electrodes 15 and 16 are grouped into electrode groups $S_1, S_2, S_3, S_4 \ldots S_n$ which are collectively referred to as electrode groups S. Each of the electrodes 15 in each of the groups are driven with a corresponding one of individually addressable voltages sources $V_1, V_2, V_3, V_4 \ldots V_n$ which are operated in accordance with various image data signals. To simplify interconnect and driver requirements, all electrodes 16 are interconnected to a common source (e.g. a ground potential). In this case, electrodes 16 are coupled in a serpentine fashion among all the electrode groups S.

Upon the application of a suitable voltage by one of the voltage sources $V_1, V_2, V_3, V_4 \ldots V_n$ to an associated one of the electrode groups $S_1, S_2, S_3, S_4 \ldots S_n$, an electric field is established in a portion of the of the electro-optic material referred to as a pixel region 11 (i.e. shown in broken lines). In this regard, an electrode group S is associated with each pixel region 11. FIG. 1B shows that each pixel region 11 includes a portion of surface 18 that is impinged by radiation 25.

The application of the voltage alters the refractive index of the electro-optic material, thereby changing a birefringent state of the pixel region 11. Under the application the corresponding drive voltage, the arrangement of electrodes 15 and 16 in each of the electrode groups $S_1, S_2, S_3, S_4 \ldots S_n$ causes each of the electrode groups to behave in a manner similar to a diffraction grating. A birefringent state of each of the pixel regions 11 can therefore be changed in accordance with the selective application of various voltages by an associated one of voltage sources $V_1, V_2, V_3, V_4 \ldots V_n$. For example, in this case when no voltage is applied to a particular electrode group S, an associated pixel region 11 assumes a first birefringent state in which output radiation 27 is emitted from surface 22 and is directed by one or more lenses (not shown) towards a surface of a recording media (also not shown) to form an image pixel thereon. In the case when a suitable voltage is applied to a particular electrode group S, the associated pixel region 11 assumes a second birefringent state in which output radiation 27 is emitted from surface 22 in a diffracted form which can be blocked by an obstruction such as an aperture (also not shown) to not form an image pixel.

Various image features are formed on a recording media by combining image pixels into arrangements representative of the image features. It is a common desire to form high quality images with reduced levels of artifacts. In particular, the visual quality of the formed image features is typically dependant on the visual characteristics of the formed image pixels themselves. For example, one important characteristic is the contrast between an image feature and surrounding regions of the recording media. Poor contrast can lead to the formation of various image features whose edges lack sharpness or are otherwise poorly defined. Another important characteristic is the accurate placement of the image pixels on the recording media.

The previously described conventional method of driving the arrangement of electrodes 15 and 16 can lead to various problems which can adversely impact a desired visual characteristic of the final image. For example, the sharpness of feature edges can suffer or an undesired deflection of output radiation 27 can arise. FIG. 1C schematically shows a subset of electrode groups $S_1, S_2, S_3$, and $S_4$ driven with various voltage levels by their corresponding voltage sources as follows: $(V_1: V)$; $(V_2: V)$; $(V_3: 0)$; and $(V_4: V)$. Voltage level "V" corresponds to a drive voltage level selected to cause substantial diffraction to be created within a pixel region 11 whereas voltage level "0" corresponds to a voltage level (i.e. a ground potential in this case) selected to not cause substantial diffraction to be created within a pixel region 11. When a pixel region 11 is made non-diffracting (e.g. the pixel region 11 corresponding to electrode group $S_3$), the average electric potential of the electrodes 15 and 16 of the pixel region is null. However, when a pixel region 11 is made diffracting (e.g. the pixel regions 11 corresponding to electrode groups $S_1, S_2$ and $S_4$) the average electric potential of the electrodes 15 and 16 of the pixel region 11 is approximately V/2. This creates an electric potential difference of V/2 between the average voltages of non-diffracting and diffracting regions of TIR modulator 10. This can give rise to long-range electric fields that deflect radiation that is propagated within the electro-optic material to produce a beam steering effect. Although the long-range fields can be relatively weak, they typically interact with the radiation over a longer path length than the shorter range diffraction grating fields. TIR modulator 10 is an example of an "unbalanced" TIR modulator.

One possible consequence of this deflection is that image pixels formed on the recording media can be shifted and a placement error arises. The degree of the placement error can vary in accordance with the image data which controls the selective application of the drive voltages. Another possible consequence can include an increase in the diffraction broadening of an image pixel since the output radiation 27 is deflected to one side in the pupil of the imaging system, thereby reducing the effective aperture of the system. Other possible consequences can include an increased sensitivity to aberrations in the imaging system.

Commonly-assigned U.S. Pat. No. 7,656,571 B1 (Reynolds) describes a total internal light modulator in which potential differences between diffracting and non-diffracting regions of the modulator are balanced. FIGS. 2A and 2B schematically show corresponding plan and side views of a TIR modulator 100 similar to a modulator described in U.S.

Pat. No. 7,656,571. TIR modulator 100 includes a member 112 comprising an electro-optic material 113. A plurality of electrodes 115 and 116 are arranged on a surface 118 of member 112. Member 112 includes surfaces 120 and 122 which are arranged to cause radiation 125 to refract and undergo total internal reflection at surface 118.

As shown in FIG. 2A, each of the electrodes 115 and 116 is elongate in form and extends along a direction that is substantially parallel to an overall direction of travel 126 of radiation 125. As shown in FIG. 2A, electrodes 115 are arranged in a plurality of first sets while electrodes 116 are arranged in a plurality of second sets. Each set of electrodes 115 is electrically driven by a corresponding one of individually controllable first voltage sources: $V_{J1}, V_{J2}, V_{J3}, V_{J4} \ldots V_{Jn}$ (i.e. collectively referred to as first voltage sources $V_J$) via a corresponding one of a plurality of electrical conductors 128A arranged on surface 118. Each set of electrodes 116 is electrically driven by a corresponding one of individually controllable second voltage sources: $V_{K1}, V_{K2}, V_{K3}, V_{K4} \ldots V_{Kn}$ (i.e. collectively referred to as second voltage sources $V_K$) via a corresponding one of a plurality of electrical conductors 128B arranged on surface 118. In this case, each of the first voltage sources $V_J$ is coupled to an associated one of the electrical conductors 128A at an interconnect element 130A provided on surface 118. In this case, each of the second voltage sources $V_K$ is coupled to an associated one of the electrical conductors 128B at an interconnect element 130B provided on surface 118. Each of the electrical conductors 128A and 128B acts as feed line between associated interconnect elements and electrode sets. FIGS. 2A and 2B show that each of the electrical conductors 128A extends over a non-pixel region 132A and that each of the electrical conductors 128B extends over a second non-pixel region 132B. As shown in FIG. 2B, neither of non-pixel regions 132A and 132B includes a portion of surface 118 that is impinged by radiation 125. Pixel regions 110 and non-pixel regions 132A and 132B are each shown in broken lines in FIG. 2A.

Each set of electrodes 115 is arranged with a set of electrodes 116 such that their respective electrodes are interdigitated with respect to one another within an associated one of electrode groups $T_1, T_2, T_3, T_4 \ldots T_n$ (i.e. collectively referred to as electrode groups T). As shown in FIGS. 2A and 2B each electrode group T is associated with one of a plurality of pixel regions 110 that are directly impinged by radiation 125.

FIG. 2C schematically shows a subset of the electrode groups T (i.e. electrode groups $T_1, T_2, T_3$, and $T_4$) of light modulator 100 driven by their corresponding voltage sources $V_J$ and $V_K$ to establish various electric potentials on each of the sets of electrodes 115 and 116 associated with each of the electrode groups T. In particular, FIG. 2C shows that electrode groups $T_1, T_2, T_3$, and $T_4$ are driven by corresponding voltage sources $V_J$ and $V_K$ as follows: $(V_{J1}: +V/2, V_{K1}: -V/2)$, $(V_{J2}: +V/2, V_{K2}: -V/2)$, $(V_{J3}: 0, V_{K1}: 0)$, and $(V_{J4}: +V/2, V_{K4}: -V/2)$. The voltages combinations of "+V/2" and "−V/2" correspond to drive voltages that are applied to an electrode group T to cause substantial diffraction within a pixel region 110 associated with the electrode group T. In this regard, a difference of V Volts between these two potentials is sufficient to cause the diffraction. The voltage combinations of "0" and "0" correspond to drive voltages that are applied to an electrode group T to not cause substantial diffraction within a pixel region 110 associated with the electrode group T. In this regard a difference of 0 Volt is insufficient to cause diffraction.

In this case, TIR modulator 100 is driven such that the averages of the voltage combinations used to create each of the different birefringent states in a pixel region 110 are substantially equal to one another. That is, the average voltages used to create a substantially non-diffracting state in a pixel region 110 (i.e. the average of 0 Volt and 0 Volt) substantially equals an average of the voltages used to create a substantially diffracting state in a pixel region 110 (i.e. the average of +V/2 Volts and −V/2 Volts). FIG. 2C schematically shows the average electric potentials imposed on the electrodes 115 and 116 of electrode groups $T_1, T_2, T_3$, and $T_4$ in this case. Unlike the aforementioned TIR modulator 10 in which a variance of V/2 Volts existed between the average electrical potentials of the non-diffracting and diffracting pixel regions 11 of TIR modulator 10, such variances are reduced in the TIR modulator 100. TIR modulator 100 is an example of a "balanced" TIR modulator.

It has been noted by the present inventors that other electrically conductive members (i.e. other than the interdigitated electrodes) can also generate electric field within an electoroptic material of a light modulator. In case of the TIR modulator 100, the present inventors have noted that a set of electrical conductors (e.g. the set of electrical conductors 128A or the set of electrical conductors 128B) can lead to the creation of an electric field. It has been noted that the electric field created by set of electrical conductors 128A or 128B typically penetrates more deeply into electro-optic material 113 than an electric field created by the electrodes in an electrode group T. This effect is simulated in FIG. 2B where an electric field 136 is generated by various electrical conductors 128A and an electric field 138 is generated by various electrical conductors 128B. Each of the generated electric fields 136 and 138 penetrate member 112 in the vicinity of non-pixel regions 132A and 132B, respectively. Although the electric fields 136 and 138 are associated with non-pixel regions 132A and 132B that include portions of surface 118 that are not directly impinged by radiation 125, electric fields 136 and 138 penetrate sufficiently within the electro-optic material 113 to interact with radiation 125. Electric fields 136 and 138 can lead to various problems including undesired beam steering of the radiation 125 that is outputted from TIR modulator 100.

There is a need for improved TIR modulators that can further reduce beam steering effects.

There is a need for improved balanced and unbalanced TIR modulators that can further reduce beam steering effects.

SUMMARY OF THE INVENTION

Briefly, according to one aspect of the present invention a total internal reflection (TIR) modulator includes a member comprising an electro-optic material; a plurality of first electrode sets; a plurality of second electrode sets; and a first set of electrical conductors, each electrical conductor in the first set of electrical conductors being coupled to one of the second electrode sets wherein the electrodes in each second electrode set are arranged in an interdigitated relationship with the electrodes in one of the first electrode sets; and each of the first electrode sets comprises a first electrode, the first electrodes being arranged in an interdigitated relationship with the electrical conductors in the first set of electrical conductors.

The invention and its objects and advantages will become more apparent in the detailed description of the preferred embodiment presented below.

BRIEF DESCRIPTION OF THE DRAWINGS

Embodiments and applications of the invention are illustrated by the attached non-limiting drawings. The attached drawings are for purposes of illustrating the concepts of the invention and may not be to scale.

DETAILED DESCRIPTION OF THE INVENTION

The invention has been described in detail with particular reference to certain preferred embodiments thereof, but it will be understood that variations and modifications can be effected within the spirit and scope of the invention.

Figure 1A:
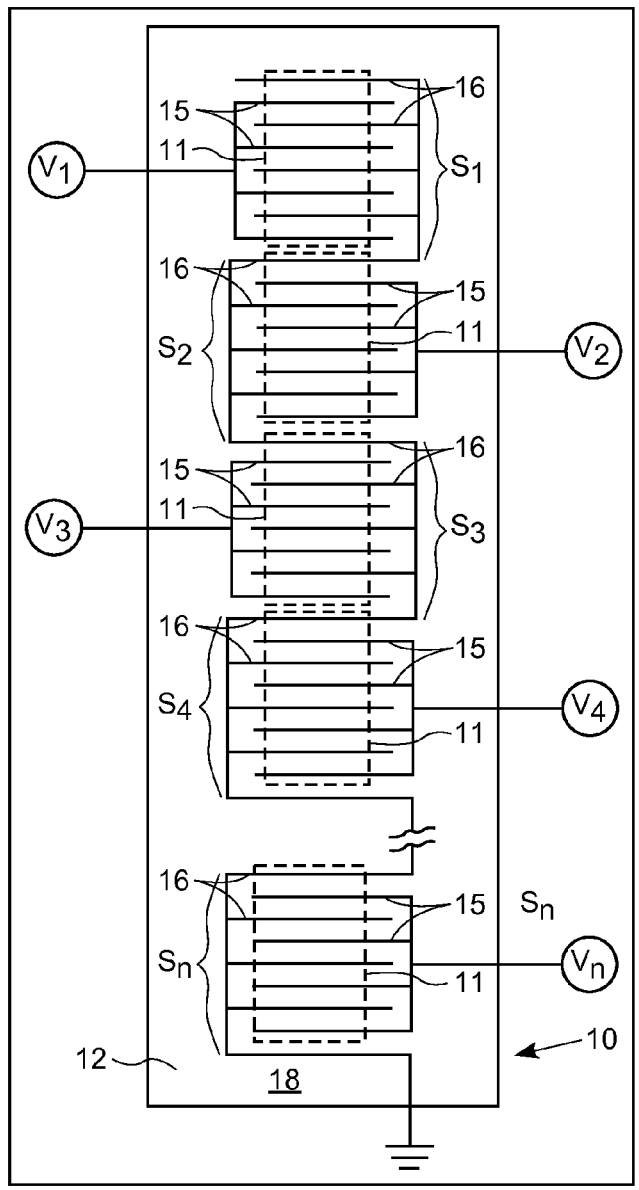
FIG. 1A is a schematic plan view of a conventional TIR modulator.
Figure 1B:
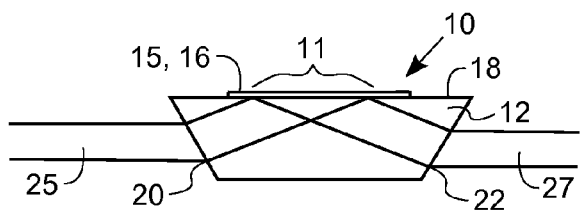
FIG. 1B is a schematic side view of the conventional TIR modulator of FIG. 1A.
Figure 1C:
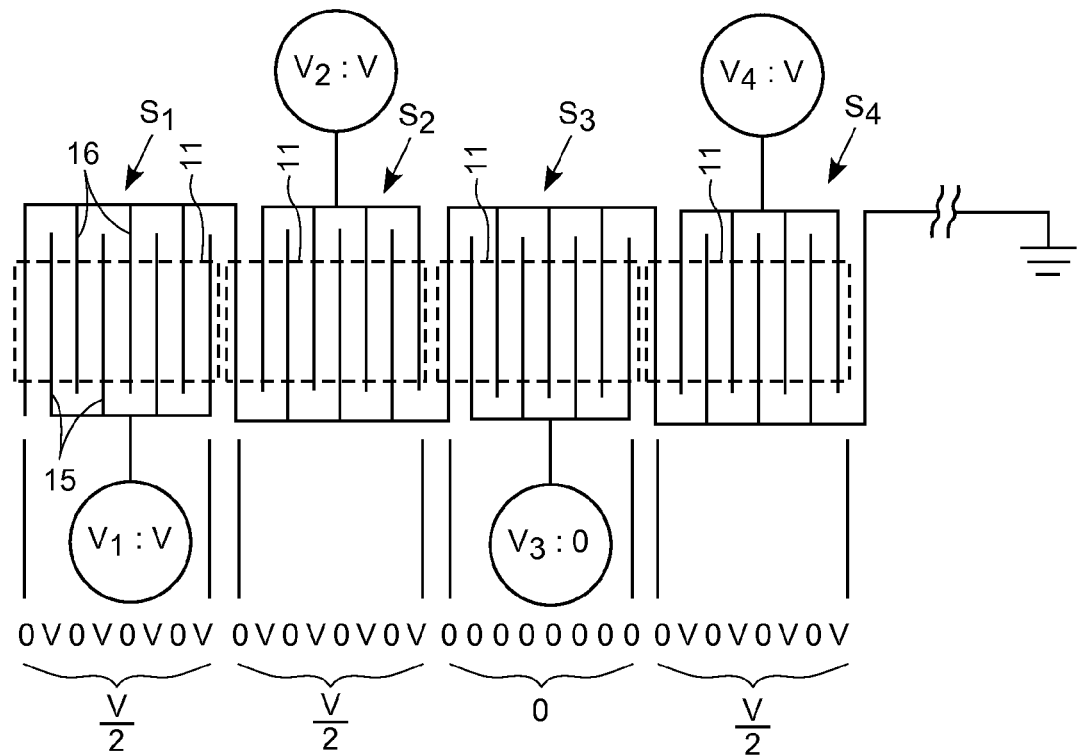
FIG. 1C schematically shows a subset of electrode groups of the conventional TIR modulator of FIG. 1A driven by various voltage levels.
Figure 2A:
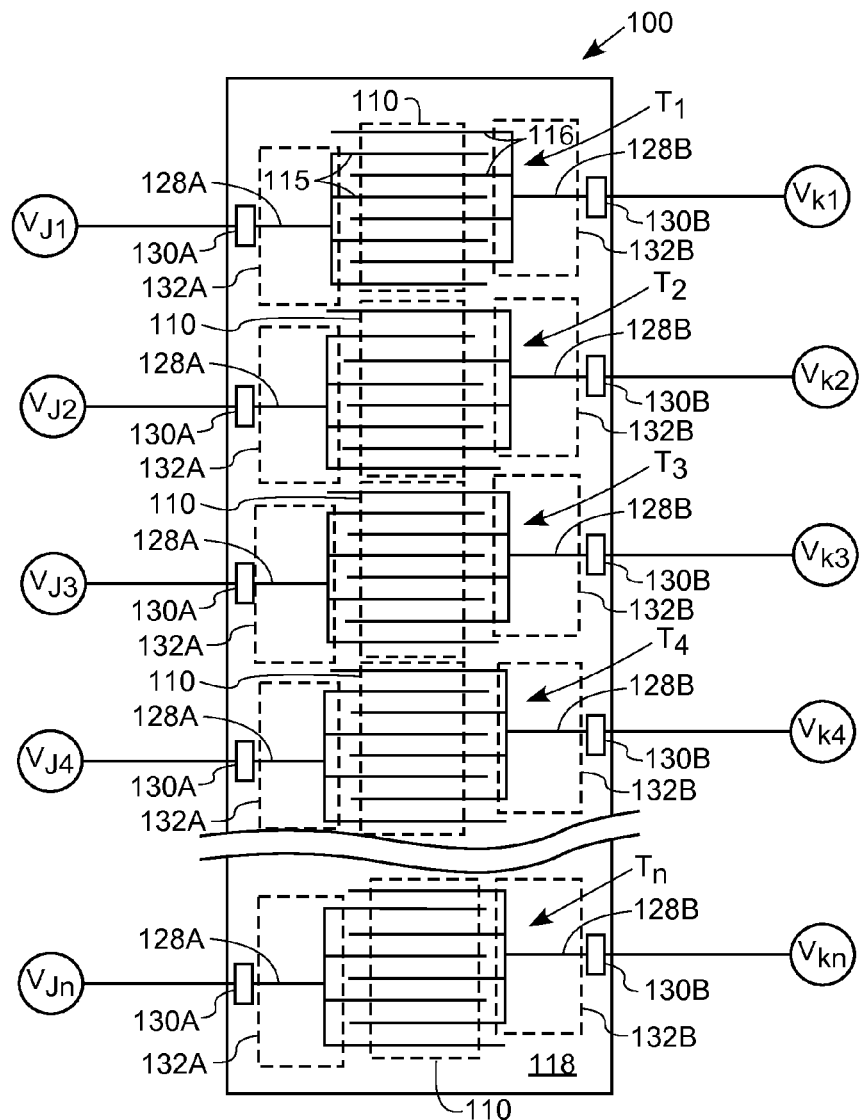
FIG. 2A is a schematic plan view of a balanced TIR modulator.
Figure 2B:
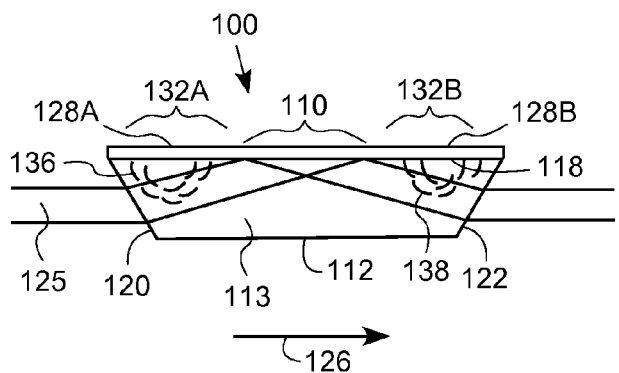
FIG. 2B is a schematic side view of the TIR modulator of FIG. 2A.
Figure 2C:
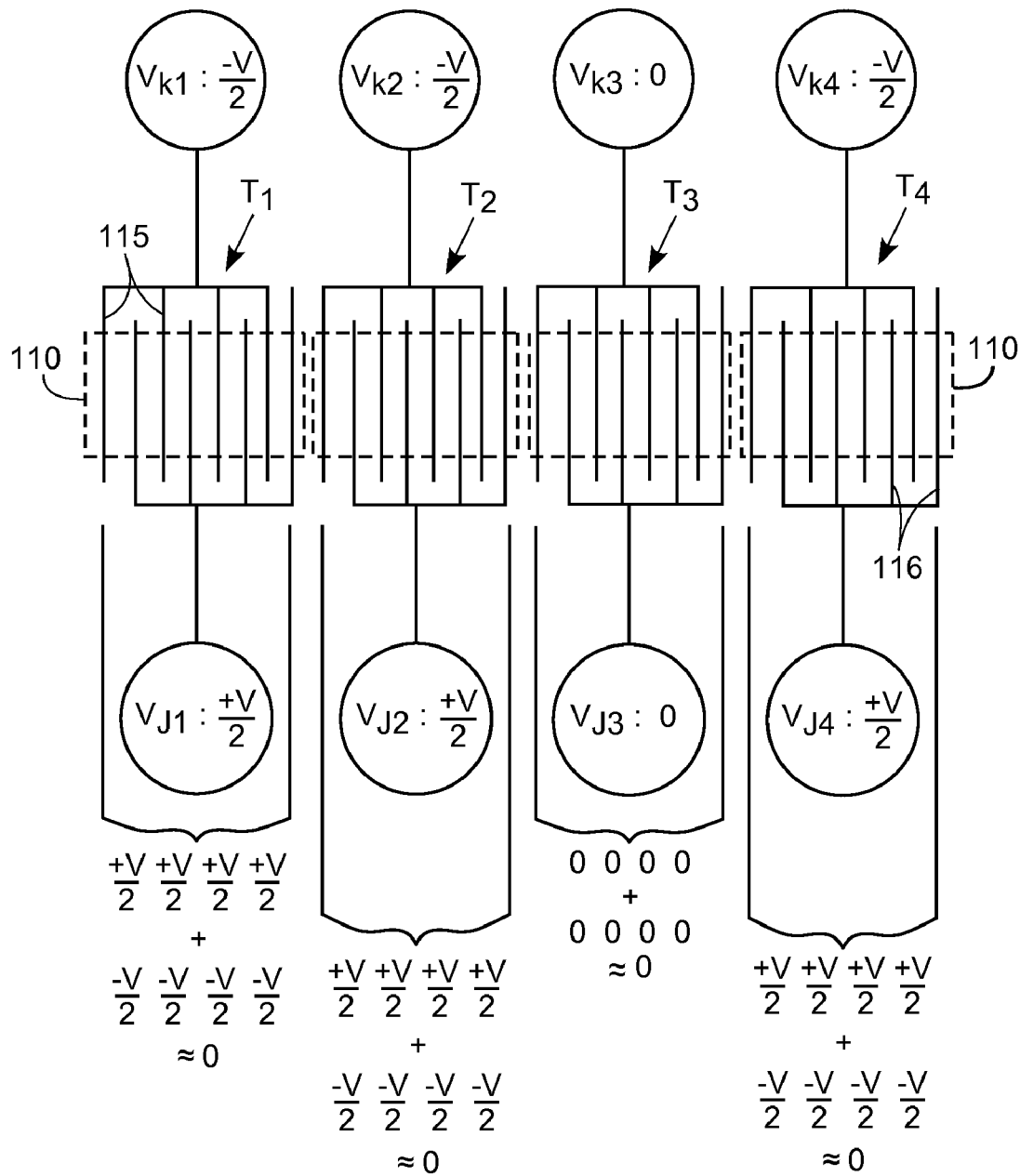
FIG. 2C schematically shows a subset of electrode groups of the modulator of FIG. 2A driven by various voltage levels.
Figure 3:
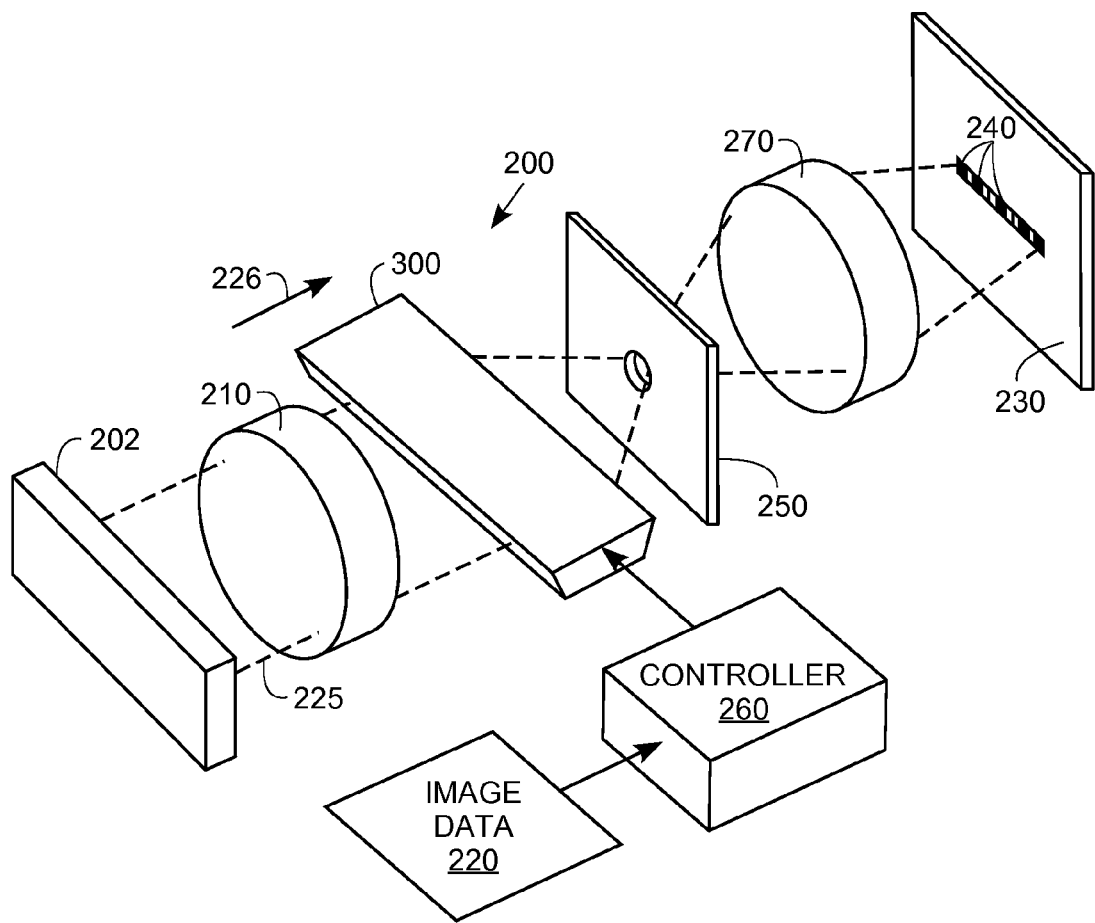
FIG. 3 schematically shows an imaging apparatus as per an example embodiment of the invention.

FIG. 3 schematically shows an imaging apparatus 200 employed by an example embodiment of the invention. Imaging apparatus 200 includes an illumination source 202 which can include a laser for example. Suitable lasers can include laser diode arrays which are relatively easy to modulate, have relatively low cost and have relatively small size. The choice of illumination source 202 can be motivated by the properties of recording media 230 that is to be imaged by imaging apparatus 200.

One or more optical elements 210 are positioned along the path of radiation 225 emitted by illumination source 202 towards light modulator 300. Radiation 225 is directed along a direction of travel 226 towards light modulator 300. Optical elements 210 can include one or more lenses employed to condition radiation 225 in various ways. For example, when diode laser arrays are employed, various degrees of beam divergence can exist along a plurality of directions. Beam divergence can include fast axis divergence and slow axis divergence for example. Optical elements 210 can include various lenses adapted to correct these divergences such as micro-lenses or crossed cylindrical lenses. Optical elements 210 can include various elements adapted to mix or reflect various radiation beams such as light pipes and fly's eye integrators for example. Optical elements 210 can include various lenses adapted to focus or redirect radiation 225 emitted by illumination source 202.

Radiation 225 that is directed onto light modulator 300 is modulated in accordance with controller 260 which selectively controls various pixel regions 310 (not shown in FIG. 3) of light modulator 300 to form various radiation beams. Image data 220 is employed by controller 260 to generate various radiation beams which are directed along a path towards an imageable surface of a recording media 230 to form various image pixels 240 thereon as required by image data 220. Other radiations beams not required by the formation of various image pixels 240 are directed elsewhere. In this illustrated embodiment, the radiation beams required to form image pixels 240 pass through an aperture 250 while radiation beams not required to form image pixels 240 are obstructed by aperture 250. One or more lenses (not shown) may be employed to direct radiation beams from light modulator 300 towards aperture 250. One or more optical elements 270 are employed to direct various radiation beams onto the imageable surface of recording media 230. Various other embodiments of the invention need not employ aperture 250, and radiation beams not required by the formation of various image pixels 240 may fall by design outside the entrance pupil of a lens of optical elements 270.

Radiation beams can be used to form image pixels 240 on recording media 230 by different methods. For example, radiation beams can be used to ablate a surface of recording media 230. Radiation beams can be used to cause transference of an image-forming material from a donor element to a surface of recording media 230 (e.g. a thermal transfer process). Recording media 230 can include an image modifiable surface, wherein a property or characteristic of the modifiable surface is changed when irradiated by a radiation beam.

Interactions between the radiation beams and the recording media 230 can vary during the formation of corresponding image pixels 240. For example, various arrangements of image pixels 240 can be formed from plurality of imagings referred to as "shots." During each shot, imaging apparatus 200 is positioned relative to a region of recording media 230. Once positioned, light modulator 300 is activated to form a first group of image pixels 240 on the region of recording media 230. Once these image pixels 240 are formed, relative movement between imaging apparatus 200 and recording media 230 is effected to position apparatus 200 in the vicinity of an adjacent region and another shot is taken to form a next group of image pixels 240 on the adjacent region. Various image pixels 240 can also be formed by scanning. Scanning can include establishing relative movement between light modulator 300 and recording media 230 as the light modulator 300 is activated to form the desired image pixels 240. Relative movement can include moving one or both of light modulator 300 and recording media 230. In some example embodiments of the invention, scanning can be performed by deflecting radiation beams emitted by light modulator 300 relative to recording media 230 to form the image pixels 240.

Figure 4A:
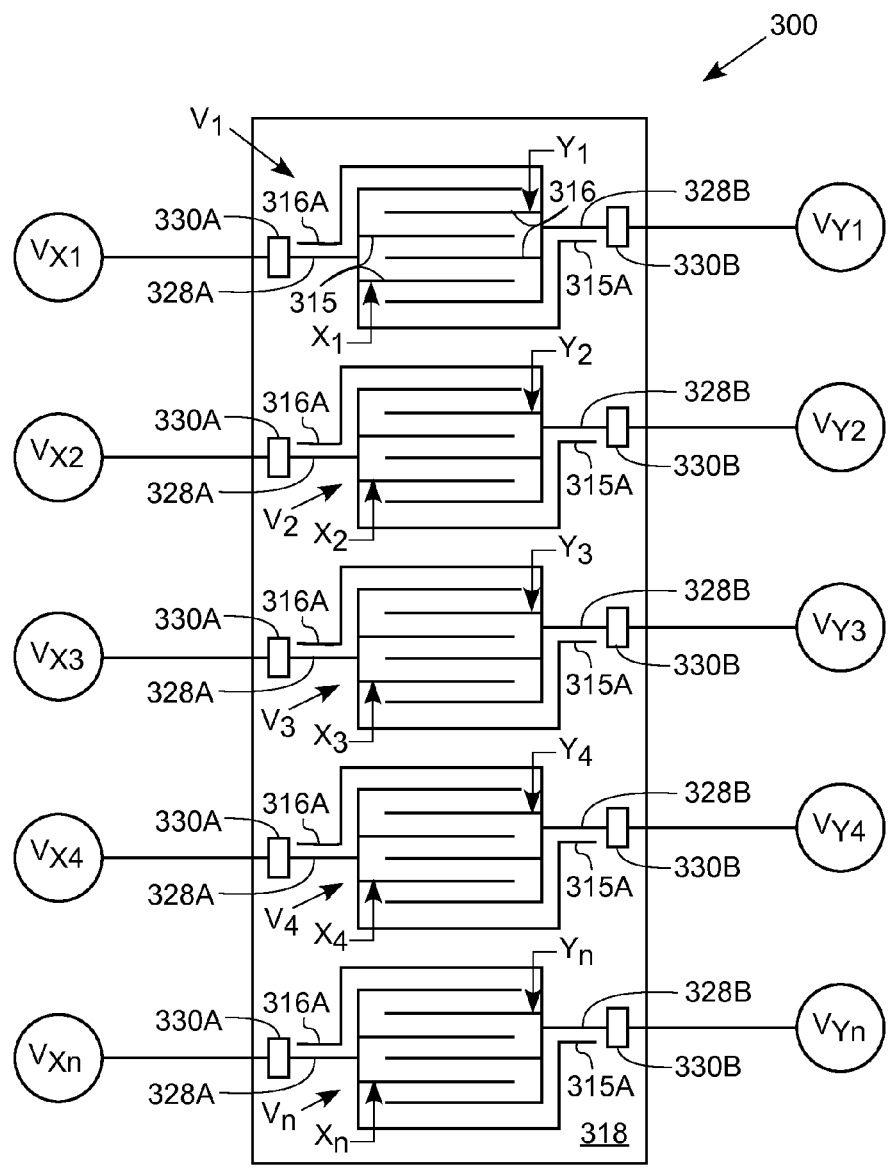
FIG. 4A is a schematic plan view of a light modulator employed in an example embodiment of the invention.
Figure 4B:
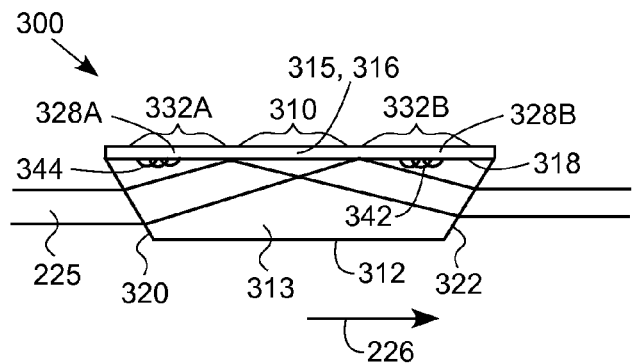
FIG. 4B is a schematic side view of the light modulator of FIG. 4A.

FIGS. 4A and 4B schematically show corresponding plan and side views of one exemplary embodiment of light modulator 300. In this example embodiment of the invention, light modulator 300 is a TIR modulator. Light modulator 300 includes a member 312 comprising an electro-optic material 313. Electro-optic material 313 can include lithium niobate (LiNbO$_3$) or lithium tantalate (LiTaO$_3$) for example. Electro-optic material 313 can include a suitably chosen material which exhibits birefringent characteristics in response to the application of a suitable electric field. A plurality of electrodes 315 and 316 are arranged on a surface 318 of member 312. Member 312 includes surfaces 320 and 322 which are arranged to cause radiation 225 to refract and undergo total internal reflection at surface 318. Other example embodiments of the invention can employ other orientations between various ones of surfaces 318, 320, and 322 and radiation 225 to cause the total internal reflection.

As shown in FIG. 4A, each of the electrodes 315 and 316 is elongate in form and extends along a direction that is substantially parallel to an overall direction of travel 226 of radiation 225. Electrodes 315 and 316 are an example of electrically conductive elements that can be formed on member 312 by various techniques known in the art. In some example embodiments, electrically conductive elements are formed by sputtering metal (e.g. gold) on surface 318. Other metal deposition methods can include evaporation. Coated surface 318 is then coated with a suitable photo-resist which is patterned by exposure to light (e.g. ultraviolet light) through a suitable mask. A development of the photo-resist removes the photo-resist locally according to the pattern, and the electrically conductive elements are formed by chemically etching away metal that is not protected by the photo-resist. Other embodiments of the invention may employ a lift-off technique in which a photo-resist is first applied to surface 318 and is patterned. Metal is then sputtered onto both surface 318 and the patterned photo-resist. The photo-resist is then dissolved so that the metal deposited on the photo-resist is removed while leaving other metal attached to surface 318 in areas where the photo-resist was absent during sputtering. In this illustrated embodiment of the invention, electrodes 315 and 316 are jointly formed on a single surface.

In this illustrated embodiment, electrodes 315 are arranged to form a plurality of first electrode sets $X_1, X_2, X_3, X_4 \ldots X_n$ (i.e. collectively referred to as first electrode sets X) while electrodes 316 are arranged to form, a plurality of second electrode sets $Y_1, Y_2, Y_3, Y_4 \ldots Y_n$ (i.e. collectively referred to as second electrode sets Y). In this example embodiment, each of the first and second electrode sets X and Y include four (4) respective electrodes 315 and 316. Other example embodiments of the invention can include first and second electrode sets X and Y made up of other suitable numbers of electrodes. The electrodes 315 within a given first electrode set X are electrically driven by a corresponding one of individually controllable first voltage sources: $V_{X1}, V_{X2}, V_{X3}, V_{X4} \ldots V_{Xn}$ (i.e. collectively referred to as first voltage sources $V_X$) via one of a plurality of electrical conductors 328A provided on surface 318. The electrodes 316 within a given second electrode set Y are electrically driven by a corresponding one of individually controllable second voltage sources: $V_{Y1}, V_{Y2}, V_{Y3}, V_{Y4} \ldots V_{Yn}$ (i.e. collectively referred to as second voltage sources $V_Y$) via one of a plurality of electrical conductors 328B provided on surface 318.

In this example embodiment, each of the voltage sources $V_X$ is coupled to an interconnect element 330A provided on surface 318. In this example embodiment, each of the voltage sources $V_Y$ is coupled to an interconnect element 330B provided on surface 318. Interconnect elements 330A, 330B can include any suitable element provided on a surface of member 312, the interconnect elements being adapted for receiving an electrical signals from a voltage source. Each of interconnects elements 330A and 330B can include a wirebond pad by way of non-limiting example.

In this example embodiment, each of the electrical conductors 328A acts as an electrical feed line between one of the interconnect elements 330A and one first electrode sets X. In this example embodiment, each of the electrical conductors 328B acts as an electrical feed line between one of the interconnect elements 330B and one of the second electrode sets Y. In some example embodiments, each of electrical conductors 328A and 328B extends along a path that is not linear. As best seen in the detailed schematic view of a portion of light modulator 300 in FIG. 4D, each of electrical conductors 328A and 328B includes a "T-shaped" portion in this example embodiment. The portion of light modulator 300 shown in FIG. 4D includes first electrode set $X_1$ and second electrode set $Y_1$. In this example embodiment each of the electrodes 315 in a given one of the first electrode sets X is coupled to one of the electrical conductors 328A at a junction point 335A. In this example embodiment each of the electrodes 316 in a given one of the first electrode sets Y is coupled to one of the electrical conductors 328B at a junction point 335B. FIGS. 4A, 4B, and 4D show that the various electrical conductors 328A extends over a non-pixel region 332A and that the various electrical conductors 328B extends over a non-pixel region 332B. Non-pixel regions 332A and 332B are schematically shown in broken lines in FIG. 4D. The schematic representation of non-pixel regions 332A and 332B depicted is for illustration purposes only and may not reflect an actual shape or size of the regions. Other sizes and shapes of non-pixel regions 332A and 332B can exist in various other example embodiments of the invention. As shown in FIG. 4B, none of non-pixel regions 332A and 332B includes a portion of surface 318 that is impinged by radiation 225.

In this example embodiment, first and second electrode sets X and Y are arranged such that each electrode 315 is adjacently positioned next to an electrode 316. In this example embodiment of the invention, each of the first electrodes sets X are arranged with another of the electrode sets Y such that their respective electrodes are interdigitated with respect to one another. In this example embodiment, each of the interdigitated electrode sets X and Y belongs to an electrode group U (i.e. one of electrode groups $U_1, U_2, U_3, U_4 \ldots U_n$).

Light modulator 300 includes a plurality of pixel regions 310, each pixel region 310 including a portion of electro-optic material 313 and one of the electrode groups U. Each pixel region 310 includes a portion of surface 318 that is directly impinged upon by radiation 225. Each pixel region 310 includes a portion of surface 318 against which radiation 225 undergoes total internal reflection. In this example embodiment, each pixel region 310 is located between a non-pixel region 332A and a non-pixel region 332B. A pixel region 310 is schematically represented in broken lines in FIG. 4D. The schematic representation of pixel region 310 depicted is for illustration purposes only and may not reflect an actual shape or size of the region. Other sizes and shapes of pixel regions 310 can exist in other example embodiments of the invention.

An electric field can be established in the electro-optic material 313 corresponding to a given pixel region 310 by appropriately driving one or both of the voltage sources $V_X$ and $V_Y$ corresponding to the given pixel region 310. In this illustrated embodiment, both voltage sources $V_X$ and $V_Y$ corresponding to given pixel region 310 are driven to impart various birefringent states on the portion of the electro-optic material associated with the given pixel region 310. Each of the pixel regions 310 is individually addressable by controlling a corresponding group of voltage sources $V_X$ and $V_Y$. In this regard, various groups of voltage sources $V_X$ and $V_Y$ can be operated independently of other groups of voltage sources $V_X$ and $V_Y$. In various example embodiments, each of the pixel regions 310 can be addressed in a manner similar to that taught by U.S. Pat. No. 7,656,571 which is herein incorporated by reference.

Each of the groups of voltage sources $V_X$ and $V_Y$ is selectively operated by controller 260 (not shown in FIGS. 4A-4D) to activate a corresponding pixel region 310 between various states. Controller 260, which can include one or more controllers, is used to control one or more systems of imaging apparatus 200 including, but not limited to, light modulator 300. In this example embodiment, controller 260 is programmed to address light modulator 300 in accordance with image data 220 which includes information representing an image to be formed. Various systems can be controlled using various control signals and by implementing various methods. Controller 260 can be configured to execute suitable software and can include one or more data processors, together with suitable hardware, including by way of non-limiting example: accessible memory, logic circuitry, drivers, amplifiers, A/D and D/A converters, input/output ports and the like. Controller 260 can comprise, without limitation, a microprocessor, a computer-on-a-chip, the CPU of a computer or any other suitable microcontroller.

Figure 4C:
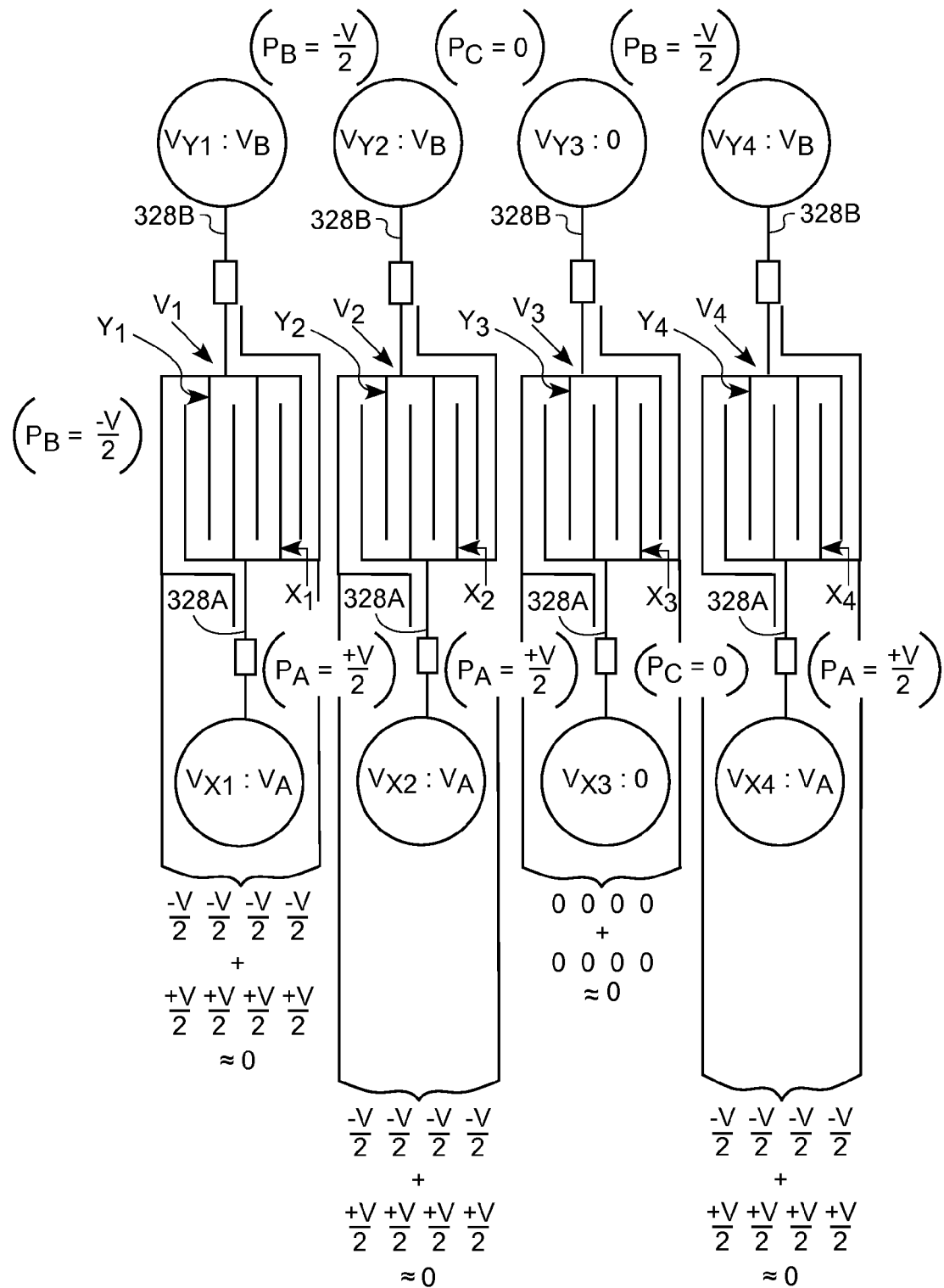
FIG. 4C schematically shows a subset of electrode groups and electrical conductors of the light modulator of FIG. 4A driven by various voltage levels.
Figure 4D:
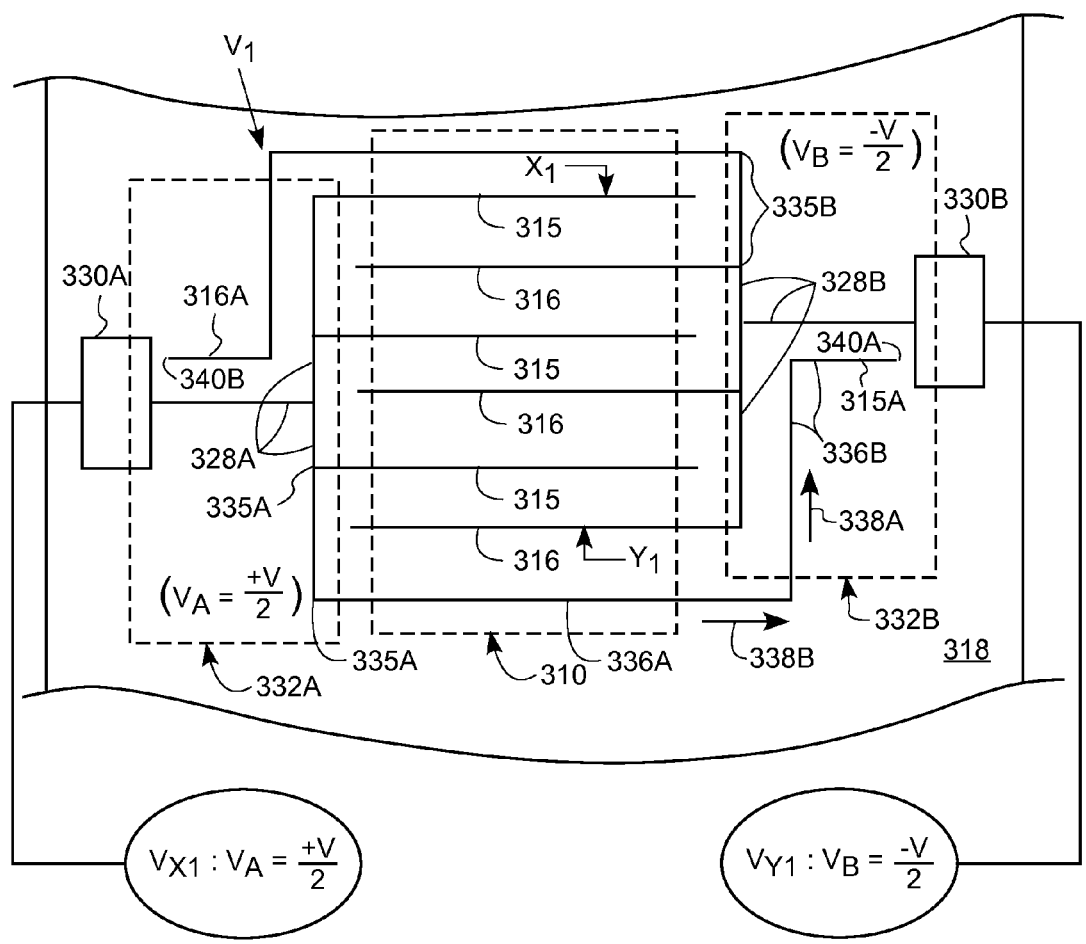
FIG. 4D is a schematic detailed view of a portion of the light modulator of FIG. 4A.

FIG. 4C schematically shows a subset of the electrode groups U (i.e. electrode groups $U_1$, $U_2$, $U_3$, and $U_4$) of light modulator 300. Each electrode group U is driven by associated voltage sources $V_X$ and $V_Y$ to apply various voltages to each of the first and second electrode sets X and Y of the electrode group U. In particular, first voltage sources $V_{X1}$, $V_{X2}$, and $V_{X4}$ are driven to apply a first voltage $V_A$ to each of their corresponding first electrode sets $X_1$, $X_2$, and $X_4$ to impose an electric potential $P_A$ thereon. Second voltage sources $V_{Y1}$, $V_{Y2}$, and $V_{Y4}$ are driven to apply a second voltage $V_8$ to each of their corresponding second electrode sets $Y_1$, $Y_2$, and $Y_4$ to impose an electric potential $P_B$ thereon. First and second voltage sources $V_{X3}$ and $V_{Y3}$ are driven to apply a third voltage $V_C$ to each of their corresponding first and second electrode sets $X_3$ and $Y_3$ to impose an electric potential $P_C$ thereon. It is understood that only the subset of electrode groups $U_1$, $U_2$, $U_3$, and $U_4$ is depicted for clarity and other electrode groups U of light modulator 300 can be activated in a similar fashion.

In various example embodiments of the invention, combinations of electric potentials $P_A$, $P_B$, and $P_C$ are selectively imposed on the first and second electrode sets X and Y of each of the electrode groups U in accordance with a desired activation state of a pixel region 310 associated with each of the electrode groups U. In various example embodiments, combinations of electric potentials $P_A$, $P_B$, and $P_C$ are selectively applied to various portions of a pixel region 310 in accordance with a desired activation state that is to be associated with the pixel region 310. Activation states can include for example: an ON state in which a pixel region 310 is activated to form an image pixel 240 on recordable media 230 and an OFF state in which a pixel region 310 is activated to not form a corresponding image pixel 240 on recordable media 230. In various example embodiments of the invention, various ones of electric potentials $P_A$, $P_B$, and $P_C$ are selectively applied to the first and second electrode sets X and Y of each of the electrode groups U to impart a desired birefringent state on a portion of the electro-optic material 313 in an associated pixel region 310. In this example embodiment, electric potentials $P_A$, $P_B$, and $P_C$ are each different from one another.

In this example embodiment of the invention, it desired that each pixel region 310 corresponding to electrode groups $U_1$, $U_2$, and $U_4$ be activated in accordance with an OFF state while the pixel region 310 corresponding to electrode group $U_3$ be activated in accordance with an ON state. In this example embodiment, the electric potentials applied to each of the first electrode sets X correspond to values selected from a first group including a plurality of predetermined electric potential values including values corresponding to each of electric potentials $P_A$ and $P_C$. The electric potentials applied to each of the second electrode sets Y correspond to values selected from a second group including a plurality of predetermined electric potential values including values corresponding to each of electric potentials $P_B$ and $P_C$. In this example embodiment, electric potentials values corresponding to each of electric potentials $P_A$ and $P_B$ are different from one another. In this example embodiment, the electric potential values corresponding to the electric potential $P_C$ is different from the electric potential values corresponding to each of the electric potentials $P_A$ and $P_B$. In this example embodiment, the first group of electric potential values includes at least one electric potential value that is not common with any of the electric potential values in the second group of electric potential values. In this example embodiment, the second group of electric potential values includes at least one electric potential value that is not common with any of the electric potential values in the first group of electric potential values. In this example embodiment, the first group of electric potential values and the second group of electric potential values together comprise three different electric potential values. The electric potential values can be the same or different from the electric potentials that are imposed as a result of their selection. In some cases, various losses can cause differences.

In various example embodiments, electric potential information is maintained. The electric potential information can specify a first combination of electric potentials to impose on an associated first and second set of the electrodes X and Y in the event that a first activation state is desired. The electric potential information can specify a second combination of electric potentials to impose on the first and second sets of the electrodes X and Y in the event that a second activation state different from the first activation state is desired. In some of these embodiments, the first combination of electric potentials comprises a plurality of electric potentials that are not common with any of the electric potentials of the second combination of electric potentials. A desired activation state is determined and an electric potential is imposed on each of the first and second sets of the electrodes X and Y according to the electric potential information corresponding to the determined desired activation state.

The selection of an electric potential value from each of the predetermined first and second groups of electric potential values can be based at least on image data 220. In this illustrated embodiment, controller 260 (not shown in FIGS. 4A-4D) has selected a combination of electric potential values corresponding to common electric potentials $P_C$ according to a first image data signal (i.e. an ON image data signal) and a combination of different electric potential values corresponding to electric potentials $P_A$ and $P_B$ according to a different second image data signal (i.e. an OFF image data signal).

In this example embodiment, an electric potential difference between the combination of electric potentials $P_C$ applied to electrode group $U_3$ is substantially null and a first birefringent state corresponding to this electric potential difference is imposed on the associated pixel region 310. This first birefringent state can be selected to not cause substantial diffraction in the radiation emitted from the associated pixel region 310. In this example embodiment, an electric potential difference between the combination of electric potentials $P_A$ and $P_B$ applied to each of the electrode groups $U_1$, $U_2$, and $U_4$ is sufficient to impose a second birefringent state on each of their associated pixel regions 310. This second birefringent state can be selected to cause substantial diffraction in the radiation emitted from each of the associated pixel regions 310.

In various example embodiments of the invention, each of the electric potentials $P_A$, $P_B$, and $P_C$ is selected such that an average of the electric potentials applied to a first pixel region 310 to impart a first birefringent state onto the first pixel region 310 is substantially equal to an average of the electric potentials applied to a second pixel region 310 to impart a second birefringent state onto the second pixel region 310. In this example embodiment, the values of $P_A$, $P_B$, and $P_C$ are selected such that the sum of electric potentials $P_C$ and $P_C$ is substantially equal to the sum of electric potentials $P_A$ and $P_B$. For example, in this illustrated embodiment, first and second voltage sources $V_{X3}$ and $V_{Y3}$ are driven to apply a voltage $V_C$ to impose an electric potential $P_C$ of approximately 0 Volt (i.e. a ground potential) on each of their corresponding first and second electrode sets $X_3$ and $Y_3$. Each of first voltage drives $V_{X1}$, $V_{X2}$, and $V_{X4}$ are driven to apply a first voltage $V_A$ to each of their corresponding first electrode sets $X_1$, $X_2$, and $X_4$ to impose an electric potential $P_A$ of +V/2 Volts thereon. Each of second voltage drives $V_{Y1}$, $V_{Y2}$, and $V_{Y4}$ are driven to apply a second voltage $V_B$ to each of their corresponding second electrode sets $Y_1$, $Y_2$, and $Y_4$ to impose an electric potential $P_B$ of −V/2 Volts thereon. In this example embodiment of the invention, voltages $V_A$ and $V_B$ impose corresponding electric potentials $P_A$ and $P_B$ that are different from one another. Specifically, electric potentials $P_A$ and $P_B$ are each substantially equal in magnitude, but comprise different polarities.

Accordingly, an electric potential difference sufficient to establish the first desired birefringent state (i.e. 0 Volts in this example) exists in electrode group $U_3$ while an electric potential difference sufficient to establish the second birefringent state (i.e. V Volts in this example) exists in each of electrode groups $U_1$, $U_2$, and $U_4$. In this example embodiment, light modulator 300 is driven such that the sums of the electric potentials combinations used to create each of the different birefringent states are substantially equal to one another. That is, a first sum of electrical potentials $P_C$ and $P_C$ (i.e. the sum of 0 Volt and 0 Volt) substantially equals a second sum of electrical potentials $P_A$ and $P_B$ (i.e. the sum of +V/2 Volts and −V/2 Volts). In this regard, light modulator 300 is driven in a balanced manner.

In other example embodiments of the invention, light modulator 300 can be driven using different techniques. For example, a common electric potential $P_C$ imposed on each of the first and second electrode sets X and Y of a particular electrode group U need not be selected to be a null or a ground potential. A first voltage source $V_X$ and its corresponding second voltage source $V_Y$ can be driven to apply voltages $V_C$ to impose non-zero electric potentials of $P_C$ Volts on each of the corresponding first and second electrode sets X and Y in accordance with a first desired birefringent state. When a change from the first birefringent state to a second birefringent state is desired (i.e. for example when change in an image data signal is encountered), the first voltage source $V_X$ can be driven to adjust voltage $V_C$ applied to the first electrode set X by a first amount (e.g. V/2 Volts) to create an adjusted voltage equal to $V_C$+V/2, and the second voltage source $V_Y$ can be driven to adjust the voltage applied to the second electrode set Y by a second amount (e.g. V/2 Volts) to create an adjusted voltage equal to $V_C$−V/2. The applied voltages are selected such that the sum of the voltages applied to the first and second electrode sets X and Y during the establishment of the first birefringent state (i.e. the sum of $V_C$ and $V_C$) substantially equals the sum of the adjusted voltages applied to the first and second electrode sets X and Y during the establishment of the second birefringent state (i.e. the sum of $V_C$+V/2 and $V_C$−V/2). Each of the initially applied voltages are selected to create an electric potential difference suitable for the establishment of the first birefringent state and each of the adjusted applied voltages are selected to create an electric potential difference suitable for the establishment of the second birefringent state. In some example embodiments, each of the applied voltages is selected to cause each of the electric potentials applied to each of the first and second electrode sets X and Y during the establishment of either birefringent state to be uni-polar in nature. A uni-polar drive can be employed to simplify drive requirements.

Referring back to FIG. 4C, it is noted that voltages $V_A$ having the same polarity (i.e. +V/2 Volts) are provided by various ones of the electrical conductors 328A which extend over non-pixel regions 332A. In a similar manner, voltages $V_B$ having the same polarity (i.e. −V/2 Volts) are provided by various ones of the electrical conductors 328B which extend over non-pixel regions 332B. The present inventors have determined that adjacent electrical conductors 328 carrying various voltage signals can cause an undesired electric field to arise in the non-pixel regions 332A, 332B that the electrical conductors 328A, 328B extend across. Without being bound by a particular theory, the present inventors believe that the depth that these electric fields penetrates the electro-optic material 313 associated with each non-pixel region 332A, 332B is proportional to the pitch or spacing between adjacent ones of the electrical conductors 328A, 328B. In the example embodiment shown in FIG. 4A, the spacing between adjacent electrical conductors 328A or adjacent electrical conductors 328B is larger than the spacing between the various adjacent electrodes in each of the electrode groups U. In this example embodiment, the spacing between adjacent electrical conductors 328A or adjacent electrical conductors 328B is relatively large in part because each of the electrode groups U includes a relatively large number of interleaved electrodes 315 and 316 thereby increasing the pitch between adjacent electrode groups U. It is to be noted that even if each electrode group U includes fewer interleaved electrodes 315 and 316 (e.g. two (2) electrodes 315 interleaved with two (2) electrodes 316) relatively large spacings between adjacent electrical conductors 328 can be required as these conductors "fan-out" over surface 318 to provide for the space requirements of elements such as interconnect elements 330A and 330B. Bends in the electrical conductors 328A and 328B can be employed to fan the electrical conductors 328A, 328B out over surface 318. Increased penetration depths of the electric fields generated in the non-pixel regions 332A and 332B can cause unwanted interactions with radiation 225 which can cause various problems such as beam steering. It is noted that these undesired electric fields are typically image data dependant.

In various example embodiments of the invention, a second electrical potential is imposed on a non-pixel region 332A, 332B onto which a first electric potential is imposed by an electrical conductor 328A, 328B that extends over the non-pixel region 332. In some example embodiments the imposed second electrical potential has an opposite polarity to the imposed first electrical potential. In some example embodiments, the first and second electrical potentials that are imposed on the non-pixel region 332A, 332B are substantially the same as the electrical potentials that are imposed on a pixel region 310 that is fed by the electrical conductor 328A, 328B. In some example embodiments, a sum of the first and second electrical potentials that are imposed on the non-pixel region 332A, 332B is substantially equal to a sum of the electric potentials that are imposed on a pixel region 310 that is fed by the electrical conductor 328A, 328B. In some example embodiments, a sum of the first and second electrical potentials that are imposed on the non-pixel region 332A, 332B is substantially the same as a sum of the electrical potentials that are imposed on a pixel region 310 that is fed by another electrical conductor 328A, 328B.

In this example embodiment, each of first electrode sets X includes a first electrode 315A. Each of the electrodes includes a portion positioned adjacently to an electrical conductor 328B. The first electrodes 315A are arranged in an interdigitated relationship with the electrical conductors 328B that are coupled to the second electrical sets Y. In this example embodiment, electrical conductors 328B are herein referred to as first electrical conductors 328B and electrical conductors 328A are herein referred to as second electrical conductors 328A. In this example embodiment, the first electrical conductors 328B form part of a first set of electrical conductors 328B. In this example embodiment, each electrode 315A includes a length that is longer than a corresponding length of any of the other electrodes 315 in an associated one of the first electrode sets X. In this example embodiment, each of the first electrodes 315A extends along a path that is substantially parallel to a path followed by one of the first electrical conductors 328B. As best shown in FIG. 4D, each of the first electrodes 315A includes a first portion 336A that is positioned abreast of an electrode 316 in an associated second electrode set Y, and a second portion 336B that is positioned abreast of a first electrical conductor 328B that is coupled to the associated second electrode set Y. As herein employed in this specification, the term "abreast" as applied to two elements means that the two elements are positioned side by side with respect to one another and each of the two elements has a similar orientation.

In this example embodiment, the first portion 336A of each first electrode 315A is positioned substantially parallel to an electrode 316 in the second electrode set. In this example embodiment, each second portion 336B is positioned substantially parallel to the first electrical conductor 328B that is coupled to the associated second electrode set Y. In this example embodiment, the first portion 336A of each first electrode 315A extends along a first path and the second portion 336B of the first electrode 315A extends along a second path, at least a part of the second path extending along a direction (i.e. represented by arrow 338A) that is different than a direction (i.e. represented by arrow 338B) that the first path extends along. In this example embodiment, each electrode 315 other than first electrode 315A in each first electrode set X is positioned between two electrodes 316 in an associated one of the second electrode sets Y. In this example embodiment of the invention, each of the first electrodes 315A extends from a junction point 335A to a termination point 340A, each termination point 340A being positioned proximate to an interconnect element 330B that is coupled to the electrode group U associated with the first electrode 315A. Each termination point 340A does not contact an interconnect element 330B that is coupled to the electrode group U associated with the first electrode 315A. In other example embodiments, termination point 340A is positioned beyond a location on surface 318 where an electric field associated with first electrical conductor 328B would interact with radiation 225 in member 312. In this example embodiment, at least one of the first electrodes 315A is positioned between two adjacently positioned first electrical conductors 328B.

In this example embodiment, each of the first electrodes 315A is adapted for communicating a voltage signal that is applied to the first set of electrodes X to the non-pixel region 332B over which the first electrode 315A extends. In this example embodiment, the voltage signal applied by each non-pixel region 332B imparts a second electric potential on the non-pixel region 332B. In this example embodiment, non-pixel region 332B is herein referred to as first non-pixel region 332B and non-pixel region 332A is herein referred to second non-pixel region 332A. The voltage signals applied to each electrode set of an interdigited first and second electrode sets X and Y can vary in accordance with a particular activation state that is to be imparted on an associated pixel region 310. Accordingly, in this example embodiment, the electric potentials imposed by a first electrical conductor 328B and a first electrode 315A that extend over a given one of first non-pixel regions 332B can vary in accordance with a particular activation state that is to be imparted on an associated pixel region 310. In some example embodiments, the first electrical conductor 328B and the first electrode 315A that extend over a given one of the first non-pixel regions 332B impose different electric potentials on the first non-pixel region 332B. In some example embodiments, the different electric potentials imposed on a first non-pixel region 332B include different polarities. In some example embodiments, the different electrical potentials imposed on a first non-pixel region 332B include substantially the same magnitude. FIG. 4D shows different potentials applied in accordance with the voltage signals $V_A$ and $V_B$ applied to electrode group $U_1$ in FIG. 4C.

In this example embodiment, an average of the electric potentials imposed by an associated first electrical conductor 328B/first electrode 315A pair on a first one of the first non-pixel regions 332B is substantially equal to an average of the electric potentials imposed by an associated first electrical conductor 328B/first electrode 315A pair on another of the first non-pixel regions 332B. In this example embodiment, the substantial equality of the average electric potentials imposed on the first non-pixel regions 332B remains substantially constant regardless of how the activation state of the pixel regions 310 change in accordance with image data 220 requirements. As previously noted, activation state changes can be accommodated by varying the first and second electric potentials imposed on a pixel region 310. In this example embodiment, an activation state change can be made to a given pixel region 310 by varying each of a first electric potential and a second electric potential imposed on it by an electrode group U by substantially the same amount with a consequence that the electrical potentials imposed on an associated first non-pixel region 332B are also varied by substantially the same amount. The imposition of the pair of electric potentials on each first non-pixel region 332B by an associated first electrical conductor 328B/first electrode 315A pair can be employed for various reasons including reducing the presence of long range electric fields in these regions.

As shown in the side view of FIG. 4B, the introduction of the second voltage signal by first electrode 315A to a first non-pixel region 332B results in a the generation of an electric field 342. In this example embodiment, the penetration depth of the electric field 342 has been limited to reduce interactions with radiation 225 thereby reducing the presence of problems such as beam steering. In this example embodiment, a spacing between each member of an associated first electrical conductor 328B/first electrode 315A pair is selected to limit the penetration depth of the electric field 342. The required spacing between each member of an associated first electrical conductor 328B/first electrode 315A pair can be determined by various techniques including direct experimentation and simulation techniques. In some example embodiments, the spacing between each member of an associated first electrical conductor 328B/first electrode 315A pair can be related to a spacing between adjacent electrodes 315 and 316. The spacing employed between each member of an associated first electrical conductor 328B/first electrode 315A pair can also be motivated by other factors including manufacturing limitations or manufacturing yield requirements.

In this example embodiment, each of the second electrode sets Y includes a second electrode 316A that is arranged in a similar manner to first electrodes 315A. In this regard, the second electrodes 316A are arranged in an interdigitated relationship with the second electrical conductors 328A. Each second electrode 316A extends from a junction point 335B to a termination point 340B. Each of the second electrodes 316A is employed to provide a voltage signal to impose a first electric potential on a second non-pixel region 332A in a similar manner as that employed with first non-pixel regions 332B. As shown in FIG. 4B, the application of this additional electric potential to each second non-pixel region 332A results in the generation of an electric field 344 whose penetration depth with electro-optic material 313 has been limited to reduce interactions with radiation 225.

Figure 5A:
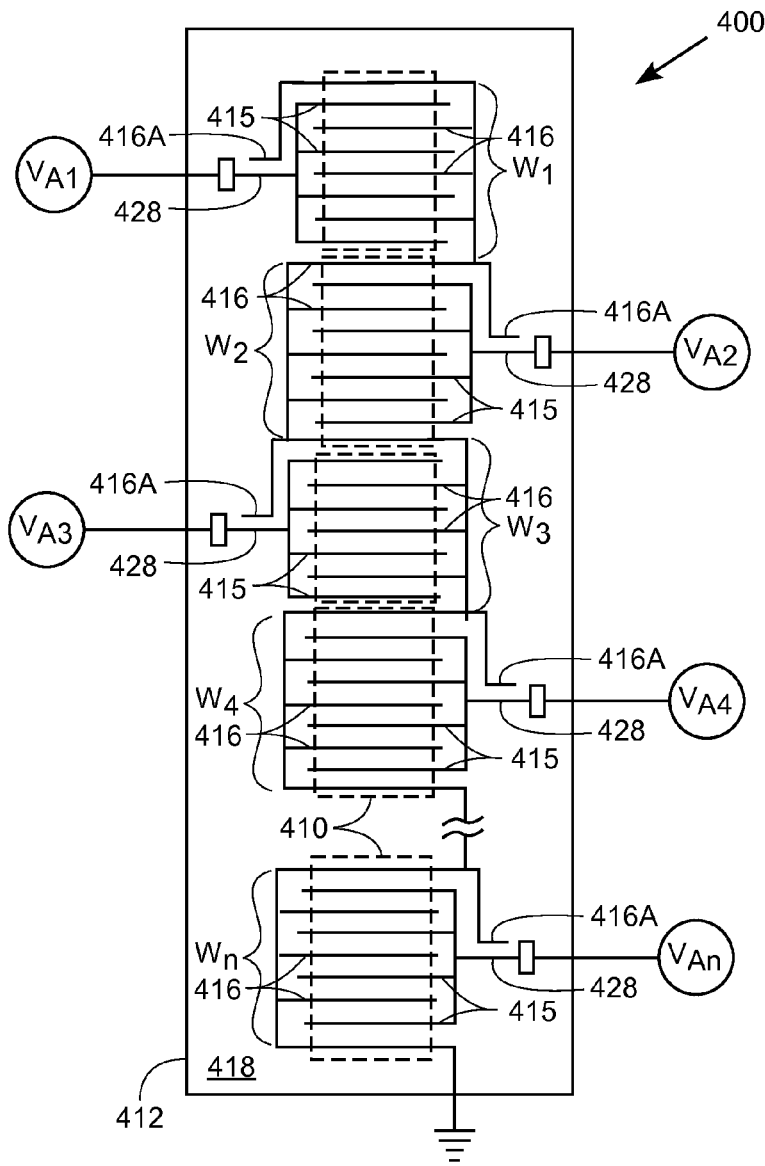
FIG. 5A is a schematic plan view of another light modulator employed in an example embodiment of the invention.
Figure 5B:
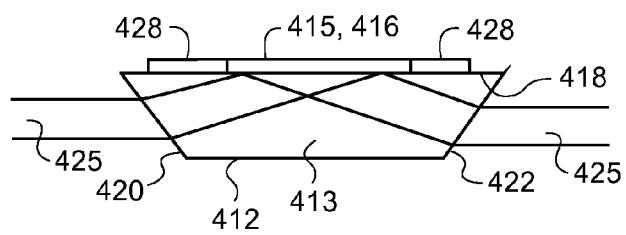
FIG. 5B is a schematic side view of the light modulator of FIG. 5A.

The light modulator 300 described in association with FIGS. 4A, 4B, 4C, and 4D is a balanced light modulator. Other example embodiments of the present invention can also be employed with unbalanced modulators. FIGS. 5A and 5B schematically show plan and side views of an unbalanced light modulator 400. Light modulator 400 includes a member 412 which includes an electro-optic material 413 and a plurality of electrodes 415 and 416 arranged in an interdigitated relationship on a surface 418 of member 412. Surfaces 420 and 422 are arranged to cause input radiation 425 to refract and undergo total internal reflection at surface 418. In this example embodiment, various electrodes 415 and 416 are grouped into electrode groups $W_1, W_2, W_3, W_4 \ldots W_n$ which are collectively referred to as electrode groups W. In this example embodiment each electrode group W is associated with a pixel region 410 (i.e. shown in broken lines) of light modulator 400. Each of the electrodes 415 in each of the groups W are driven by a corresponding one of individually addressable voltages sources $V_{A1}, V_{A2}, V_{A3}, V_{A4} \ldots V_{An}$ via one of a plurality of electrical conductors 428 extending over a non-pixel region of light modulator 400. In this example embodiment, all of the electrodes 416 are electrically coupled to a common source (e.g. a ground potential in a serpentine fashion). Each of the electrode groups W includes a first electrode 416A. In this example embodiment, the first electrodes 416A are arranged in an interdigitated relationship with the electrical conductors 428. Although light modulator 400 still behaves in an unbalanced manner in this example embodiment, each of the first electrode 416A/electrical conductor 428 pairs effectively reduces an overall electric potential imposed on a non-pixel region of light modulator 400 thereby reducing unwanted diffractive effects in the non-pixel region. In this example embodiment, the overall electrical potential is effectively equal to an average of the electric potentials associated with each member of a electrode 416A/electrical conductor 428 pair is imposed on a non-pixel region.

The invention has been described in detail with particular reference to certain preferred embodiments thereof, but it will be understood that variations and modifications can be effected within the scope of the invention.

PARTS LIST

10 TIR modulator
11 pixel region
12 member
15 electrodes
16 electrodes
18 surface
20 surface
22 surface
25 input radiation
27 output radiation
100 TIR modulator
110 pixel region
112 member
113 electro-optic material
115 electrodes
116 electrodes
118 surface
120 surface
122 surface
125 radiation
126 direction of travel
128A electrical conductor
128B electrical conductor
130A interconnect element
130B interconnect element
132A non-pixel region
132B non-pixel region
134 non-pixel region
136 electric field
138 electric field
200 imaging apparatus
202 illumination source
210 optical element(s)
220 image data
225 radiation
226 direction of travel
230 recording media
240 image pixel
250 aperture
260 controller
270 optical element(s)
300 light modulator
310 pixel region
312 member
313 electro-optic material
315 electrode
315A first electrode
316 electrode
316A second electrode
318 surface
320 surface
322 surface
328A electrical conductor/second electrical conductor
328B electrical conductor/first electrical conductor
330A interconnect element
330B interconnect element
332A non-pixel region/second non-pixel region
332B non-pixel region/first non-pixel region
335A junction point
335B junction point
336A first portion
336B second portion
338A arrow
338B arrow
340A termination point
340B termination point
342 electric field
344 electric field
400 light modulator
410 pixel region
412 member
413 electro-optic material
415 electrode
416 electrode
416A first electrode
418 surface
420 surface
422 surface
425 input radiation
428 electrical conductor $P_A$ electric potential
$P_B$ electric potential
$P_C$ electric potential
$S_1$ electrode group
$S_2$ electrode group
$S_3$ electrode group
$S_4$ electrode group
$S_n$ electrode group
$T_1$ electrode group
$T_2$ electrode group
$T_3$ electrode group
$T_4$ electrode group
$T_n$ electrode group
$U_1$ electrode group
$U_2$ electrode group
$U_3$ electrode group
$U_4$ electrode group
$U_n$ electrode group
$W_1$ electrode group
$W_2$ electrode group
$W_3$ electrode group
$W_4$ electrode group
$W_n$ electrode group
$V_1$ voltage source
$V_2$ voltage source
$V_3$ voltage source
$V_4$ voltage source
$V_n$ voltage source
$V_{A1}$ voltage source
$V_{A2}$ voltage source
$V_{A3}$ voltage source
$V_{A4}$ voltage source
$V_{An}$ voltage source
$V_A$ voltage
$V_B$ voltage
$V_C$ voltage
$V_{J1}$ first voltage source
$V_{J2}$ first voltage source
$V_{J3}$ first voltage source
$V_{J4}$ first voltage source
$V_{Jn}$ first voltage source
$V_{K1}$ second voltage source
$V_{K2}$ second voltage source
$V_{K3}$ second voltage source
$V_{K4}$ second voltage source
$V_{Kn}$ second voltage source
$V_{X1}$ first voltage source
$V_{X2}$ first voltage source
$V_{X3}$ first voltage source
$V_{X4}$ first voltage source
$V_{Xn}$ first voltage source
$V_{Y1}$ second voltage source
$V_{Y2}$ second voltage source
$V_{Y3}$ second voltage source
$V_{Y4}$ second voltage source
$V_{Yn}$ second voltage source
$X_1$ first electrode set
$X_2$ first electrode set
$X_3$ first electrode set
$X_4$ first electrode set
$X_n$ first electrode set
$Y_1$ second electrode set
$Y_2$ second electrode set
$Y_3$ second electrode set
$Y_4$ second electrode set
$Y_n$ second electrode set

The invention claimed is:

1. A total internal reflection (TIR) modulator comprising:
a member comprising an electro-optic material;
a plurality of first electrode sets on a surface of the TIR modulator;
a plurality of second electrode sets on the surface of the TIR modulator; and
a first set of electrical conductors, each electrical conductor in the first set of electrical conductors being coupled to one of the second electrode sets; wherein:
the electrodes in each second electrode set are arranged in an interdigitated relationship with the electrodes in one of the first electrode sets; and each of the first electrode sets comprises a first electrode, the first electrodes being arranged in an interdigitated relationship with the electrical conductors in the first set of electrical conductors; and
wherein a voltage applied to a first electrode set or a second electrode set or both, causes a change in a birefringent state of the member, which changes an angle of reflection off the surface.

2. The TIR modulator of claim 1, wherein each first electrode comprises a length that is longer than a length of any of the other electrodes in an associated one of the first electrode sets.

3. The TIR modulator of claim 1, wherein each first electrode extends along a path that is substantially parallel to a path followed by one of the electrical conductors in the first set of electrical conductors.

4. The TIR modulator of claim 1, further comprising a second set of electrical conductors, each electrical conductor in the second set of electrical conductors being coupled to one of the first electrode sets.

5. The TIR modulator of claim 4, wherein each of the second electrode sets comprises a second electrode, the second electrodes being arranged in an interdigitated relationship with the electrical conductors in the second set of electrical conductors.

6. The TIR modulator of claim 4, wherein each electrode other than the first electrode in each first electrode set is positioned between two electrodes in an associated one of the second electrode sets.

7. The TIR modulator of claim 6, wherein each electrode other than the second electrode in each second electrode set is positioned between two electrodes in an associated one of the first electrode sets.

8. The TIR modulator of claim 1, wherein the first electrode sets, the second electrode sets and the first set of electrical conductors are arranged on a same surface of the member.

9. The TIR modulator of claim 1, wherein each electrical conductor in the first set of electrical conductors is coupled to a single different one of the second electrode sets.

10. A total internal reflection (TIR) modulator comprising:
a member comprising an electro-optic material;
a first set of electrodes and a second set of electrodes, the electrodes in the first set of electrodes being arranged in an interdigitated relationship with the electrodes in the second set of electrodes on a surface of the member; and
a first electrical conductor arranged on the surface of the member, the first electrical conductor being coupled to the second set of electrodes, wherein the first set of electrodes comprises a first electrode, a first portion of the first electrode being positioned abreast of an electrode in the second set of electrodes, and a second portion of the first electrode being positioned abreast of the first electrical conductor; and
wherein a voltage applied to the first set of electrodes or the second set of electrodes or both, causes a change in a birefringent state of the member, which changes an angle of reflection off the surface.

11. The TIR modulator of claim 10, wherein the first portion of the first electrode and the electrode in the second set of electrodes are parallel to one another and the second portion of the first electrode and the first electrical conductor are parallel to one another.

12. The TIR modulator of claim 10, wherein the first portion of the first electrode extends along a first path and the second portion of the of the first electrode extends along a second path, at least a part of the second path extending along a direction that is different than a direction that the first path extends along.

13. The TIR modulator of claim 10, further comprising a second electrical conductor arranged on the surface of the member, the second electrical conductor being coupled to the first set of electrodes; wherein the second set of electrodes comprises a second electrode, a first portion of the second electrode being positioned abreast of an electrode of the first set of electrodes, and a second portion of the second electrode being positioned abreast of the second electrical conductor.

14. The TIR modulator of claim 13, wherein the first electrical conductor is adapted for providing a first voltage to the second set of electrodes, and the second electrical conductor is adapted for providing a second voltage to the first set of electrodes, wherein the first voltage is different than the second voltage.

15. The TIR modulator of claim 14, wherein the first voltage and the second voltage comprise different polarities.

16. The TIR modulator of claim 15, wherein the first voltage and the second voltage comprise substantially equal magnitudes.

17. The TIR modulator of claim 13, wherein each of the first electrical conductor and the second electrical conductor is coupled to an interconnect element provided on the surface, each interconnect element being adapted for receiving an electrical signal provided to the member.

18. The TIR modulator of claim 17, wherein each interconnect element comprises a wirebond pad.

19. The TIR modulator of claim 17, wherein the second portion of the first electrode terminates at a point proximate to the interconnect element coupled to the first electrical conductor and the second portion of the second electrode terminates at a point proximate to the interconnect element coupled the second electrical conductor.

20. A total internal reflection (TIR) modulator comprising:
a member comprising an electro-optic material;
a plurality of first electrode sets, each of the first electrode sets comprising a first plurality of elongated electrodes arranged on a surface of the member;
a plurality of second electrode sets, each of the first second electrode sets comprising a second plurality of elongated electrodes arranged on the surface of the member; and
a first set of electrical conductors, each electrical conductor in the first set of electrical conductors being coupled to one of the second electrode sets and each electrical conductor in the first set of electrical conductors being adapted to provide an electrical signal to each electrode in an associated one of the second electrode sets; wherein:
the electrodes in each second electrode set are arranged in an interdigitated relationship with the electrodes in one of the first electrode sets; and at least one of the first electrode sets comprises a first electrode, each first electrode being positioned between two adjacent electrical conductors in the first set of electrical conductors; and
wherein a voltage applied to a first electrode set or a second electrode set or both, causes a change in a birefringent state of the member, which changes an angle of reflection off the surface.

21. The TIR modulator of claim 20, wherein each first electrode comprises a length that is longer than the length of any of the other electrodes in an associated one of the first electrode sets.

22. The TIR modulator of claim 20, wherein each first electrode extends along a path that is substantially parallel to a path followed by one of the electrical conductors in the first set of electrical conductors.

23. The TIR modulator of claim 20, further comprising a second set of electrical conductors, each electrical conductor in the second set of electrical conductors being coupled to one of the first electrode sets.

24. The TIR modulator of claim 23, wherein each of the second electrode sets comprises a second electrode, the second electrodes being arranged in an interdigitated relationship with the electrical conductors in the second set of electrical conductors.

25. The TIR modulator of claim 20, wherein each electrode other than the first electrode in each of the at least one of the first electrode sets is positioned between two electrodes in an associated one of the second electrode sets.

26. The TIR modulator of claim 20, wherein each electrical conductor in the first set of electrical conductors is coupled to a single different one of the second electrode sets.

* * * * *